United States Patent [19]

Dunkelberger

[11] 4,141,935
[45] Feb. 27, 1979

[54] THERMOPLASTIC FILM HAVING IMPROVED OUTDOOR WEATHERABILITY

[75] Inventor: David L. Dunkelberger, Newtown, Pa.

[73] Assignee: Rohm and Haas Company, Philadelphia, Pa.

[21] Appl. No.: 876,805

[22] Filed: Feb. 10, 1978

[51] Int. Cl.² .............................................. C08L 31/02
[52] U.S. Cl. ................................ 260/885; 260/42.52; 428/463; 428/522
[58] Field of Search ......................................... 260/885

[56] References Cited

U.S. PATENT DOCUMENTS

| 3,562,235 | 2/1971 | Ryan | 260/885 |
| 3,808,180 | 4/1974 | Owens | 260/885 |
| 3,812,205 | 5/1974 | Dunkelberger | 260/885 |

Primary Examiner—Carman J. Seccuro
Attorney, Agent, or Firm—Lester E. Johnson; Michael B. Fein

[57] ABSTRACT

Improved thermoplastic polymeric compositions prepared in multiple-stage sequentially produced polymerization are provided. The compositions are characterized as polymer particles having an elastomeric crosslinked core sheathed by three increasingly harder thermoplastic copolymer shells. The polymer particles are preferably isolated, dried and converted into film using heat and pressure.

8 Claims, No Drawings

THERMOPLASTIC FILM HAVING IMPROVED OUTDOOR WEATHERABILITY

This invention relates to multiple-stage sequentially produced thermoplastic polymer composition of alkyl esters of acrylic and methacrylic acid. More particularly, this invention relates to multiple-stage sequentially produced aqueous emulsion copolymers containing the product of four stages of polymerization. The polymeric products of the invention are particularly suited for the production of films, particularly continuous films which an be applied to various substrates.

Ryan, U.S. Pat. No. 3,562,235 discloses a multistage, preferably a four-stage, heterogeneous thermoplastic copolymer, and a process for preparing such copolymer, wherein the first stage is a rubbery, uniformly crosslinked copolymer formed by emulsion copolymerizing an alkyl acrylate with a small amount of crosslinking monomer, in the presence of an initiating system, preferably redox in nature, under such reaction conditions as to form particles having a size in the range of 400 to 2000 angstrom units in radius. Then, as a second stage, and in the presence of the preformed first stage, there is polymerized a mixture of lower alkyl methacrylates and alkyl acrylates under conditions such that the chains become attached to and/or intimately associated with the crosslinked poly(alkyl acrylate) chains from the first stage. During the second stage, additional initiator may be added, but no additional emulsifier is ordinarily used, so that essentially no new, additional and distinct particles are produced. After completion of the second stage polymerization, a mixture of lower alkyl methacrylates and alkyl acrylates is added and polymerized in the presence of the performed two-stage polymer, thereby causing attachment and/or intimate association of the third stage with the two-stage polymer. Again conditions are employed so that no new, additional and distinct particles are formed. In the fourth stage, there is polymerized a mixture of a predominant amount of lower alkyl methacrylate and, optionally, a minor amount of alkyl acrylate, and, preferably, an additional small amount of an adhesion promoter such as methacrylic acid, in the presence of the preformed three-stage polymer, thereby causing attachment and/or intimate association of the fourth stage with the three-stage polymer. The resultant solid, thermoplastic polymeric product is isolated by any suitable technique such as, for example, by coagulation or spray-drying. The patent to Ryan, U.S. Pat. No. 3,562,235, is incorporated herein by reference.

Dunkelberger, U.S. Pat. No. 3,812,205, discloses a process for preparing a two-stage polymeric material produced by emulsion polymerizing, to a particle size of up to about 1300 angstrom units in diameter, a monomer mixture of a major amount of alkyl acrylate, a minor amount of one or more copolymerizable monoethylenically unsaturated comonomer, a crosslinking monomer, and at least one allyl ester of an $\alpha,\beta$-unsaturated carboxylic acid (i.e., a graftlinking monomer) to form a first-stage polymer. Then, in the presence of the preformed first stage, there is emulsion polymerized a mixture of at least 80% by weight of a hard alkyl ester of methacrylic acid, the balance being one or more copolymerizable monoethylenically unsaturated monomers, under conditions such that the second stage becomes attached to the first stage. The patent discloses a composition having the advantages of the above-described Ryan patent and improved resistance to haze resulting from exposure to water by the incorporation of graftlinking monomer in the first stage of a two-stage polymer, thereby obviating the necessity of the four-stage polymer composition of Ryan. The patent to Dunkelberger, U.S. Pat. No. 3,812,205, is incorporated herein by reference.

Owens, U.S. Pat. No. 3,808,180, discloses a multiphase composite interpolymer comprising a first elastomeric phase, having a glass transition temperature of less than 10° C. polymerized from a monomer mix of at least 50 weight percent of alkyl or aralkyl acrylate, 0.05 to 5.0 weight percent of a graftlinking monomer, 0.05 to 5.0 weight percent of a cross-linking monomer, about 0-10.0 weight percent of a hydrophilic monomer, and the balance other copolymerizable ethylenically unsaturated monomer; and a final, rigid thermoplastic phase polymerized in the presence of the elastomeric phase from a monomer mix of at least about 50 weight percent alkyl methacrylate, wherein the elastomeric phase and the thermoplastic phase have a minimum chemical attachment level of about 20%. The patent discloses improvements in haze resistance on exposure to water and impact resistance.

Owens, U.S. Pat. No. 3,793,402, a continuation-in-part of the same original application from which the above-mentioned Owens patent issued, discloses a low haze, (i.e., good initial clarity) impact resistant thermoplastic composition of a blend of ( 1) 10–96 weight percent of a rigid thermoplastic polymer polymerized from a predominant amount of lower alkyl methacrylate and (2) 90–4 weight percent of a multi-stage sequentially produced polymer characterized by (a) a non-elastomeric, relatively hard first stage having a glass transition temperature of greater than 25° C. and polymerized from a monomer mixture of 70–100 weight percent of at least one lower alkyl methacrylate 0–10 weight percent of a crosslinking monomer, and 0.05–5.0 weight percent of a graftlinking monomer; (b) an intermediate elastomeric stage polymerized in the presence of the first stage from a monomer mix of 50–99.9 weight percent of an alkyl acrylate, 0–49.9 weight percent of a copolymerizable monoethylenically unsaturated monomer, 0–5.0 weight percent of a crosslinking monomer, and 0.05–5.0 weight percent of a graftlinking monomer, this stage characterized in that it would exhibit a glass transition temeprature of 25° C. or less if it were prepared in the absence of the first stage; and (c) a final stage polymerized in the presence of the two-stage intermediate polymer product from a monomer mixture of 70–100 weight percent of at least one lower alkyl methacrylate, the final stage being characterized in that it would exhibit a glass transition temperature greater than 25° C. if it were polymerized in the absence of the two-stage intermediate polymer product. As in the above-mentioned Owens patent, this patent discloses improvements in haze resistance on exposure to water and temperature.

Owens, U.S. Pat. No. 3,843,753, a division of Owens U.S. Pat. No. 3,808,180, discloses a thermoformable blend of a rigid thermoplastic polymer and the composite interpolymer described above.

It has now been found that, by the carefully controlled incorporation of at least one copolymerizable graftlinking monomer into both the first and second stages of a multiple-stage heteropolymer similar to that disclosed in Ryan, U.S. Pat. No. 3,562,235, a polymer composition can be obtained which, as an extruded film, has outdoor durability properties superior to any of the known compositions discussed above.

In accordance with the present invention, there is provided in a multiple-stage sequentially produced thermoplastic polymeric composition comprising (a) a first elastomeric, relatively soft first-stage polymer polymerized from an aqueous emulsified monomer system containing from about 75–99.8 weight percent of at least one $C_2$ to $C_8$ alkyl acrylate and about 0.1–5 weight percent of at least one crosslinking polyethylenically unsaturated monomer, the balance to total 100 weight percent of first-stage monomer system comprising one or more copolymerizable monoethylenically unsaturated monomers, and the monomer system being chosen so that the maximum glass transition temperature is not over $-20°$ C.;

(b) a second-stage polymer polymerized, in the presence of the resultant aqueous system from the first-stage polymerization, from an aqueous emulsified monomer system containing about 10–90 weight percent of at least one $C_2$ to $C_8$ alkyl acrylate, and 9–89.9 weight percent of at least one $C_1$ to $C_4$ alkyl methacrylate;

(c) a third-stage polymer polymerized, in the presence of the resultant aqueous system from the second-stage polymer from an aqueous emulsified monomer system containing about 5–40 weight percent of at least one $C_2$ to $C_8$ alkyl acrylate and about 95–60 weight percent of at least one $C_1$ to $C_4$ alkyl methacrylate; and (d) a final fourth-stage polymer polymerized, in the presence of the resultant aqueous system from the third-stage polymerization, from an aqueous emulsified monomer system containing about 80–100 weight percent of at least one $C_1$ to $C_4$ alkyl methacrylate and the balance, to total 100 weight percent of the fourth-stage monomer system, of at least one $C_2$ to $C_8$ alkyl acrylate; the weight of the first-stage monomer system being about 10–75% of the total weight of the polymer composition and the weight of the subsequent stages being about 90–25% of the total weight of the polymeric composition, the improvement characterized by:

incorporating into each of the first- and second-stage monomer systems from about 0.1 to 1 weight percent of at least one graftlinking polyethylenically unsaturated monomer.

In another aspect, the invention comprises, as an article of manufacture, a film of the composition of the invention having a thickness of 0.1–50 mils.

In still another aspect, the invention comprises, as an article of manufacture, a composite article comprising a film of the composition of the invention applied to a substrate.

The first stage monomer system comprises from about 75–99.8 weight percent, perferably from about 94–99.8 weight percent, of at least one $C_2$ to $C_8$ alkyl acrylate, the alkyl group being a straight or branched chain; from about 0.1–5 weight percent, preferably from about 0.25–1.5 weight percent, of at least one crosslinking monomer; and 0.1–1 weight percent of at least one graftlinking monomer. The polymer formed in the first stage, generally, must have a glass transition temperature of not over $-20°$ C. The first-stage polymer may comprise about 10–75% of the total weight of the resultant four-stage polymer composition; the balance may be distributed evenly or unevenly among the subsequent stages, with the provision that no single subsequent stage be present in an amount less than 20% nor more than 75% of the total amount of the weight of the remaining subsequent stages.

Among the other copolymerizable monoethylenically unsaturated monomers which can be used in the first-stage monomer system with the alkyl acrylate are, for example, vinylidene chloride, vinyl chloride, acrylonitrile, vinyl esters, o-, m-, and p-methyl styrenes, $\alpha$-alkylstyrenes, and the like.

The term "crosslinking polyethylenically unsaturated monomer" or "crosslinking monomer", as used throughout the specification, means a copolymerization monomer which contains at least two addition polymerizable unsaturated functional groups, each of which polymerize at about the same rate. The crosslinking monomers include polyacrylic and polymethacrylic esters of polyols such as, for example, butylene diacrylate and dimethacrylate, trimethylolpropane trimethacrylate, and the like; di- and trivinyl benzene, and the like; and vinyl esters such as vinyl acrylate; and other crosslinking monomers. The alkylene diacrylates are preferred for crosslinking with the alkyl acrylates of the first stage.

The term "graftlinking polyethylenically unsaturated monomer" or "graftlinking monomer", as used throughout the specification, means a copolymerizable monomer which contains at least two addition polymerizable unsaturated functional groups, each of which polymerize at substantially different rates with respect to each other. Examples of graftlinking monomers suitable for use in the invention include allyl, methallyl, and crotyl esters of $\alpha,\beta$-unsaturated monocarboxylic and dicarboxylic acids such as, for example, allyl methacrylate and acrylate; and diallyl maleate, fumarate, and itaconate. Allyl methacrylate and acrylate are preferred.

A significant limitation on the character of the fourth stage is that its glass transition temperature should be at least 60° C. Lower alkyl, i.e., $C_1$ to $C_4$, alkyl, methacrylates can be used in the fourth stage, as well as in the prior stages except the first stage. Preferably, the last stage contains from about 1 to 20 parts per 100 parts of the fourth-stage ester monomers of another polymerizable ethylenically unsaturated compound as an adhesion promoter which incorporates acid units therein selected from the group consisting of $\alpha,\beta$-ethylenically unsaturated monocarboxylic and dicarboxylic acids. Suitable unsaturated acids include acrylic, methacrylic, maleic, fumaric, and itaconic acids.

Any of a variety of emulsifiers well known for emulsion polymerization of acrylates and methacrylates can be used. The type and level of emulsifier used controls the size of the first-stage polymer. A low level of emulsifier is desirable, preferably below one weight percent based on total weight of monomers charged in all stages. Useful emulsifiers include common soaps, alkylbenzenesulfonates, $C_8$ to $C_{18}$-alkylphenoxypolyethylene sulfonates, sodiumlauryl sulfate, salts of long-chain amines, salts of long-chain carboxylic and sulfonic acids, and the like.

The polymerization medium in each stage preferably contains an effective amount of a suitable oil-soluble, water-insoluble, free radical generating polymerization initiator, which is activated either thermally or by an oxidation-reduction (redox) reaction. Preferably, the initiator is a redox initiator system since they allow for efficient polymerization at moderate reaction temperatures. Examples of suitable initiator systems are combinations such as cumene hydroperoxide-sodium metabisulfite, diisopropylbenzene hydroperoxide-sodium formaldehyde sulfoxylate, and the like. Water-soluble initiators may also be used although they are less desirable.

The multiple-stage polymeric compositions of the invention may have melt index values in the range 0.01 to 20 with the range 0.75 to 3.5 being preferred. These compositions also desirably have minimum film forming temperatures (MFT) of about 60–100° C.

In making the composition of the present invention, it is desirable that the first stage average particle size be in the range of about 500 to 4000 angstrom units in diameter, preferably about 1000 to 1500 angstrom units so as to impart to articles produced therefrom advantageous durability properties.

The term "sequentially produced", as used in the specification, refers to polymers which are prepared in aqueous dispersion or emulsion and which are polymerized in the presence of a preformed latex prepared from a prior monomer charge and stage in which each succeeding stage is attached to or intimately associated with its preceding stage. The compositions of the invention are sequentially produced by processes which are described in the Ryan and Dunkelberger patents mentioned above, which patents are incorporated herein by reference.

The compositions of the invention are especially suited to be melt formed, for example melt extruded, into films and sheets having exception outdoors durability. Films and sheets formed from the compositions of the invention may vary in thickness from 0.1–50 mils, preferably from 1–10 mils. For the purpose of this invention, the term "film" is generic to the term "sheet." Ordinarily, such films are prepared by extrusion and/or extrusion blowing and compression molding techniques which are well known in the art at temperatures ranging from about 350° F. to 500° F. The films may subsequently be applied to a metallic or non-metallic substrate to provide a composite article. Where desired, the films may be compounded to include common fillers, pigments, dyes, stabilizers, and the like. Common fillers which are suitable include, for example, calcium carbonate, diatomaceous earth, and the like. Common pigments which may be used include, for example, titanium dioxide, cadmium reds, chrome oranges and yellows, phthalocyanine greens and blues, carbon black and the like. If fillers and/or pigments are used, the first-stage particle size can approach the higher limit of the range set forth above since the appearance properties of films of the compositions of the invention are not deleteriously effected. The pigments and/or fillers, when used, should be selected so as to obtain desirable weathering properties in films made therefrom. The selection of particular pigments and/or fillers and of amounts thereof is known to those having ordinary skill in the art.

The following non-limiting examples illustrate only a few embodiments of the invention and compare some of its characteristics with those of the prior art. All parts and percentages are by weight unless otherwise mentioned.

Abbreviations used in the EXAMPLES are defined as follows:

BA = butyl acrylate
BDA = 1,3-butylene glycol diacrylate
MMA = methyl methacrylate
MAA = methacrylic acid
ALMA = allyl methacrylate
n-DDM = n-dodecyl mercaptan
MFT = minimum film forming temperature

EXAMPLE 1
Preparation of a 4-Stage Polymer of the Invention and Film Therefrom This example illustrates a four-stage polymer of the invention, the monomer having a composition abbreviated as follows: 25(BA/BDA/ALMA:98.5/1.0/0.5)//25(BA/MMA/ALMA:40/60/0.5)//25(MMA/BA/n-DDM:90/10/0.5)//25(MMA/BA/n-DDM:90/10/1.5).

To a reactor equipped with stirrer, thermometer, nitrogen inlet, inlets for monomer addition, and reflux condenser, are charged 7100 parts deionized water, 1.54 parts glacial acetic acid, and 15 parts dioctyl sodium sulfosuccinate (70% in BA) and the mixture is sparged with the nitrogen for 60 minutes at 72° C. At the end of this sparge period, 270 parts of the first-stage monomer mixture (prepared by combining 2000 parts BA, 20 parts BDA, 10 parts ALMA, 15 parts dioctyl sodium sulfosuccinate and 150 parts deionized water) is charged to the reactor, the stirring rate is adjusted to about 120 rpm, 4 parts polymerization initiator emulsion (prepared by combining 60 parts diisopropylbenzene hydroperoxide, 30 parts 10% solution of potassium dodecylbenzene sulfonate, and 1110 parts deionized water) and 120 parts 1% aqueous solution of sodium sulfoxylate formaldehyde are charged to the reactor. When the temperature of the resulting mixture begins to increase and the color of the reaction mixture changes, an additional 30 parts polymerization initiator emulsion described above and the remainder of the first-stage monomer mixture are charged to the reactor during a period of 60 minutes while maintaining the temperature at 85° C., whereupon the first-stage polymerization is carried out to substantial completion by maintaining the reaction mixture at 85° C. for an additional 30 minutes. The second stage is then added by charging to the reactor, which contains the first-stage polymerization reaction product mixture, 200 parts 1% aqueous solution of sodium sulfoxylate for formaldehyde followed by the second-stage monomer mixture (prepared by combining 800 parts BA, 1200 parts MMA, 10 parts ALMA, 14 parts dioctyl sodium sulfosuccinate (70% in BA) and 150 parts deionized water) and 30 parts polymerization initiator emulsion described above during a period of 60 minutes while maintaining the temperature at 85° C., whereupon the second-stage polymerization is carried out to substantial completion by maintaining the reaction mixture at 85° C. for an additional 30 minutes.

The stirring rate is increased to about 140 rpm and 200 parts 1% aqueous sodium sulfoxylate formaldehyde solution is charged to the reactor, which contains the second-stage polymerization reaction product mixture. Then the third-stage monomer mixture (prepared by combining 200 parts BA, 1800 parts MMA, 8 parts n-DDM, 13 parts dioctyl sodium sulfosuccinate (70% in BA) and 150 parts dionized water) and 160 parts polymerization initiator emulsion described above are charged to the reactor during a period of 60 minutes while maintaining the temperature at 85° C., whereupon the third-stage polymerization is carried out to substantial completion by maintaining the reaction mixture at 85° C. for an additional 30 minutes.

The fourth stage is then added by charging to the reactor, which contains the third-stage polymerization reaction product mixture, 400 parts 1% aqueous sodium sulfoxylate formaldehyde solution followed by the fourth-stage monomer mixture (prepared by combining 180 parts BA, 1800 parts MMA, 20 parts n-DDM and 12 parts dioctyl sodium sulfosuccinate (70% in BA)) and 320 parts polymerization initiator emulsion described above during a period of 60 minutes while maintaining the temperature at 85° C., whereupon the fourth-stage polymerization is carried out to substantial completion by maintaining the reaction mixture at 85° C. for an additional 30 minutes. The resulting four-stage polymer emulsion is allowed to cool to room temperature, collected by filtration, and spray dried. The product is characterized as follows:

Recovery:
wt. of emulsion = 17,350 parts
% solids = 44.8
% overall conversion = 97.0
melt viscosity = 5016 poise at 400° F./1000 sec$^{-1}$
MFT = 77° C.

| Particle size: | Blue Light | Green Light | Red Light |
|---|---|---|---|
| stage I | 880 A | 900 A | 960 A |
| stage IV | 1310 A | 1320 A | 1340 A |

The polymer is melt extruded into 3-mil film. The film, further, is laminated to aluminum and Plexiglas$^R$ (Rohm and Haas Company), respectively. Properties of the film are presented in the TABLES which follow below.

EXAMPLE 2

Preparation of Another 4-Stage Polymer of the Invention and Film Therefrom

A four-stage polymer, and film therefrom, is prepared as in EXAMPLE 1 except that the fourth stage monomer mixture is prepared from a monomer combination of (MMA/BA/MAA:98/2/4). Properties of the film are presented in the TABLES which follow below.

EXAMPLE 3

Preparation of a Prior Art 4-Stage Polymer and Film Therefrom

A four-stage polymer, and film therefrom, is prepared according to EXAMPLE 1 of Ryan, U.S. Pat. No. 3,562,235, the monomer mixture having a composition abbreviated as follows: 25(BA/BDA:100/1.0)//25(-MMA/BA:60/ 40)//25(MMA/BA:90/10)//25 (MMA/BA/MAA:98/2/4). Properties of the film are presented in the TABLES which follow below.

EXAMPLE 4

EXAMPLE 3 is repeated except that di-2-ethylhexyl (dioctyl) sodium sulfosuccinate is used as the emulsifier in the place of sodium octylphenyloxypolyethoxy sulfonate of EXAMPLE 1 of Ryan, U.S. Pat. No. 3,562,235, resulting in a smaller first-stage particle size.

EXAMPLE 5

Preparation of a Prior Art 2-Stage Polymer and Film Therefrom

A two-stage polymer, and film therefrom, is prepared according to Example 3 of Dunkelberger, U.S. Pat. No. 3,812,205, using as the emulsifier dioctyl sodium sulfosuccinate, the monomer mixture having a composition abbreviated as follows: 42(BA/BDA/AL-MA:100/1/0.5)//58(MMA/BA:95/5). Properties of the film are presented in the TABLES which follow below.

EXAMPLE 6

Preparation of a Comparative 4-Stage Polymer and Film Therefrom

A four-stage polymer, and film therefrom, is prepared as in EXAMPLE 1 except that the graftlinker is excluded from the first-stage monomer mixture and the graftlinker is replaced by a crosslinker in the second-stage monomer mixture. The overall monomer mixture has the following composition: 25(BA/B-DA:100/1)//25(BA/MMA/BDA:40/60/1)//25(-MMA/BA:90/10)//25(MMA/BA:90/10). Properties of the film are presented in TABLE I which follows below.

EXAMPLE 7

Preparation of Another Comparative 4-Stage Polymer and Film Therefrom

A four-stage polymer, and film therefrom, is prepared as in EXAMPLE 1 except that the graftlinker is excluded from the first-stage monomer mixture. The overall monomer mixture has the following composition: 25(BA/BDA:100/1)//25(BA/MMA/AL-MA:40/60/0.5)//25(MMA/BA:90/10)//25(MMA/-BA:90/10). Properties of the film are presented in TABLE I which follows below.

EXAMPLE 8

Preparation of Another Comparative 4-Stage Polymer and Film Therefrom

A four-stage polymer, and film therefrom, is prepared as in EXAMPLE 1 except that the graftlinker is excluded from the second-stage monomer mixture. The overall monomer mixture has the following composition: 25(BA/BDA/ALMA:100/1/0.5)//25(BA/M-MA:40/60)//25(MMA/BA:90/10)//25(MMA/-BA:90/10). Properties of the film are presented in TABLE I which follows below.

TABLE I

| Effect of Crosslinking and/or Graftlinking on Weathering of Unpigmented Film/Plexiglas$^a$ Composites | | | | | | | | | |
|---|---|---|---|---|---|---|---|---|---|
| Film Composition | PWLT$^b$ % | | | Haze % | | | Turbidity 0–5 | | |
| Example No. | 0 | 18 mo. | 2 yr. | 0 | 18 mo. | 2 yr. | 0 | 18 mo. | 2 yr |
| 1 | 83.5 | 84.0 | — | 8.7 | 9.0 | — | 2.5 | 2 | — |
| 3 | 90.0 | — | 71.2 | 2.8 | — | 19.0 | 3 | — | 4 |
| 6 | 86.4 | 85.5 | 79.5 | 5.9 | 5.8 | 11.5 | 1.5 | 3.5 | 4 |
| 7 | 87.5 | 88.0 | 88.8 | 5.2 | 5.3 | 5.1 | 2.5 | 2 | 2.0 |
| 8 | 87.0 | 82.0 | 80.5 | 4.6 | 9.4 | 12.0 | 2.5 | 2 | 3.5 |

$^1$Plexiglas is a trademark of Rohm and Haas Company
PLWT = Parallel White Light Transmission

TABLE II

Effect of Graftlinking & Emulsifier on Weathering of Blue Pigmented Film[c]/Aluminum Composities

| Film Composition Example No. | First Stage Particle Size, Diameter (A) | Haze[d] 12 mo. | Haze[d] 18 mo. | Haze[d] 24 mo. | Dulling[e] 12 mo. | Dulling[e] 18 mo. | Dulling[e] 24 mo. | Color Change[f] 12 mo. | Color Change[f] 18 mo. | Color Change[f] 24 mo. |
|---|---|---|---|---|---|---|---|---|---|---|
| 2 | 1260/1300[g] | 0 | Sl. | V. Sl. | 0 | 0 | 0 | 1F | 2F | 1½ F |
| 3 | ca. 1800 | Bad | Bad | V. Bad | 0 | V. Sl. | Sl. | 2½ F | 4½ F | 4F |
| 4 | 1140/1200[g] | Bad | Bad | V. Bad | 0 | Sl.-Some | Sl. | 3F | 4½ F | 4F |
| 5 | 1060/1150[g] | Sl. | Some | Sl.-Some | 0 | Sl. | V. Sl. | 2F | 3F | 2½ F |

[c](Pigment & Level) Each film is uniformly pigmented to provide earthtone blue color.
[d]Haze = Surface whitening upon outdoor exposure.
Sl. = slight;
V. Sl. = very slight;
V. Bad = very bad.
[e]Dulling = loss of surface gloss
Sl. = =slight;
V. Sl. = very slight
[f]Color Change = fading in color upon outdoor exposure
F = Faded Color
OF (no color change) - 5F (most color change)
[g]measured at blue light/green light The data presented in TABLE I shows that incorporating crosslinker into the second stage provides some improvement in outdoor durability but the polymers containing allyl functionality (allyl methacrylate) remain unchanged after two years exposure. The addition of ALMA to just the first stage also provides some improvement in outdoor durability but it is not nearly as effective as when it is incorporated into just the second stage. Incorporation of ALMA into both the first and second stages provides outstanding durability after 18 months; the sample was lost before 2-year exposure data could be obtained.

The data in TABLE II shows that a pigmented film of the invention, EXAMPLE 2, exhibits outstanding resistance to hazing, dulling and color change when compared with prior art films. Haze, dulling and color change ratings are determined by visual comparison with samples cut from the original unexposed composites.

What is claimed is:

1. In a multiple-stage sequentially-produced thermoplastic polymeric composition comprising:
   (a) a first elastomeric, relatively soft first-stage polymer polymerized from an aqueous emulsified monomer system containing from about 75–99.8 weight percent of at least one $C_1$ to $C_8$ alkyl acrylate and about 0.1–5 weight percent of at least one crosslinking polyethylenically unsaturated monomer, the balance to total 100 weight percent of first-stage monomer system comprising one or more copolymerizable monoethylenically unsaturated monomers, and the monomer system being chosen so that the maximum glass transition temperature is not over $-20°$ C.;
   (b) a second-stage polymer polymerized, in the presence of the resultant aqueous system from the first-stage polymerization, from an aqueous emulsified monomer system containing about 10–90 weight percent of at least one $C_1$ to $C_8$ alkyl acrylate, and 9–89.9 weight percent of at least one $C_1$ to $C_4$ alkyl methacrylate;
   (c) a third-stage polymer polymerized, in the presence of the resultant aqueous system from the second-stage polymerization from an aqueous emulsified monomer system containing about 5–40 weight percent of at least one $C_1$ to $C_8$ alkyl acrylate and about 95–60 weight percent of at least one $C_1$ to $C_4$ alkyl methacrylate; and
   (d) a final fourth-stage polymer polymerized, in the presence of the resultant aqueous system from the third-stage polymerization, from an aqueous emulsified monomer system containing about 80–100% weight percent of at least one $C_1$ to $C_4$ alkyl methacrylate and the balance, to total 100 weight percent of the fourth-stage monomer system, of at least one $C_1$ to $C_8$ alkyl acrylate; the weight of the first-stage monomer system being about 10–75% of the total weight of the polymer composition and the weight of the subsequent stages being about 90–25% of the total weight of the polymeric composition, the improvement characterized by:
   incorporating into each of the first- and second-stage monomer systems from about 0.1 to 1 weight percent of at least one graftlinking monomer which is a copolymerizable monomer containing at least two addition polymerizable unsaturated functional groups, each of which polymerize at substantially different rates with respect to each other.

2. The composition of claim 1 wherein the graftlinking monomer is selected from the group consisting of allyl, methallyl, and crotyl esters of $\alpha,\beta$-ethylenically unsaturated monocarboxylic and dicarboxylic acids.

3. The composition of claim 2 wherein the alkyl acrylate in each step is butyl acrylate, the crosslinking monomer in the first-stage is 1,3-butylene glycol diacrylate, the alkyl methacrylate in the last three stages in methyl methacrylate, and the graftlinking monomer in the first- and second-stage is allyl methacrylate.

4. The composition of claim 2 wherein there is included in the fourth stage about 1 to 20 parts per 100 parts of fourth-stage ester monomers of another polymerizable ethylenically unsaturated compound as an adhesion promoter which incorporates acid units therein selected from the group consisting of $\alpha,\beta$-ethylenically unsaturated monocarboxylic and dicarboxylic acids.

5. The composition of claim 2 wherein there is included a small amount of pigment.

6. As an article of manufacture, a film formed of the composition of claim 1 having a thickness of 0.1–50 mils.

7. As an article of manufacture, a film formed of the composition of claim 5 having a thickness of 0.1–50 mils.

8. As an article of manufacture, a composite article comprising a film of the composition of claim 6 applied to a substrate.

* * * * *